United States Patent [19]
Elchyshyn

[11] 3,795,454
[45] Mar. 5, 1974

[54] ADJUSTABLE BORING BAR WITH LUBRICANT PASSAGES

[76] Inventor: Stephen Elchyshyn, 23105 Collins St., Woodland Hills, Calif. 91364

[22] Filed: Oct. 1, 1971

[21] Appl. No.: 185,500

[52] U.S. Cl................... 408/197, 408/60, 408/188
[51] Int. Cl........................ B23b 29/10, B23q 3/12
[58] Field of Search... 408/198, 188, 197, 186, 146, 408/147, 238, 239; 287/53 R

[56] References Cited
UNITED STATES PATENTS

| | | | |
|---|---|---|---|
| 2,430,823 | 11/1947 | Nielsen | 408/197 |
| 3,377,685 | 4/1968 | Carlstedt | 408/239 |

*Primary Examiner*—Francis S. Husar
*Attorney, Agent, or Firm*—Nilsson, Robbins, Wills & Berliner

[57] ABSTRACT

An adjustable boring bar is described, as for use in a machine tool for machining inside diameters in various workpieces. An elongated shank matingly receives a head for holding cutting tools. Near the end of the shank, a transverse bore (one end closed) telescopically receives a pin that is coupled out of the bore to the head by a stud extending through a transverse slot in the end of the shank. A lubricant passage is provided through the shank and the head which also receives a nozzle as for directing lubricant at the instant location of cutting. The head and the shank also define aligned index surfaces to facilitate adjustment and measurements. Forms of the bar are disclosed for receiving both inserts and conventional cutting tools.

6 Claims, 8 Drawing Figures

ADJUSTABLE BORING BAR WITH LUBRICANT PASSAGES

BACKGROUND AND SUMMARY OF THE INVENTION

Boring bars in a variety of sizes and types are in widespread use in machine tools, primarily for cutting or otherwise machining inside diameters of workpieces. Generally in the past, boring bars have either been integral (with a shank and tool-holding head unitary) or adjustable (with the shank and head mechanically joined). Normally in accordance with somewhat conventional practice, integral boring bars are generally selected if suitable for a particular job. This consideration stems from the fact that conventional prior forms of adjustable boring bars have been considered less solid than integral bars. That is, as prior adjustable boring bars have lacked the rigidity or stiffness of integral bars, integral bars have generally been favored in the past providing they could be used for a particular job. Consequently, although a large number of adjustable boring bars have been previously proposed, a need remains for a structural form of bar affording improved rigidity along with an effective mechanism for adjustability.

Frequently, in using a boring bar, cooling the cutting tool and the workpiece presents a substantial problem. That is, as the cutting edge is operating inside the workpiece, direction and control of a liquid coolant can be extremely difficult. Additionally, in many set-up operations, the flowing coolant may serve to remove chips from the working area as well as to cool the components involved in the operation. Consequently, flow paths become somewhat critical. Although it has been previously proposed to provide coolant variously through a boring bar for purposes of cooling and chip removal, a need remains for an improved system of providing coolant in a manner that is effective.

In general, the present invention is directed to an improved form of boring bar which incorporates structure affording certain advantages as considered above as well as other advantages as will become apparent from a consideration of the detailed embodiments. Generally, the boring bar hereof utilizes a telescopically received pin which is transversely movable within the shank of a boring bar (adjacent one end) and which is connected through an elongate radial slot to the cutter-holding head. This structure along with mating shoulders that are defined on the head and the shank provide a particularly rigid boring bar. The structure hereof also incorporates an effective coolant-delivery means, a chip-breaking structure, and measurement reference means.

BRIEF DESCRIPTION OF THE DRAWINGS

In the drawings, which constitute a part of this specification, exemplary embodiments demonstrating various objectives and features hereof are set forth as follows.

and

Figure 1:
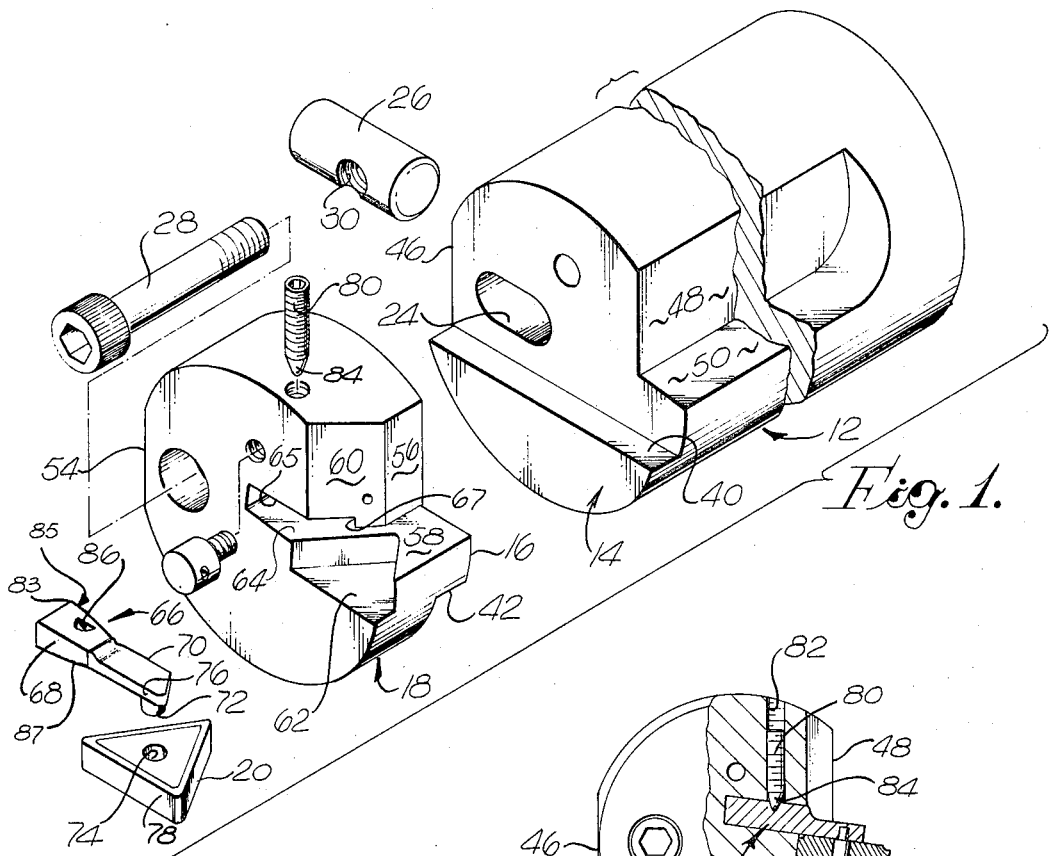
FIG. 1 is an exploded, fragmentary perspective view of a boring bar constructed in accordance with the present invention.
Figure 8:
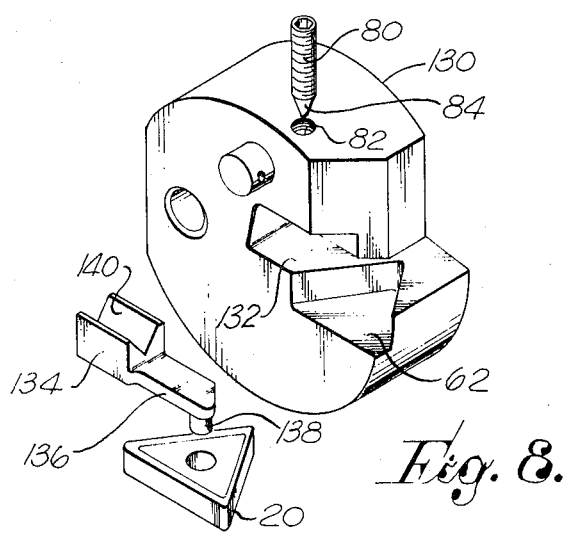

FIG. 8 is an exploded, perspective view of still another alternative form of a portion of the structure of FIG. 1.

DESCRIPTION OF THE ILLUSTRATIVE EMBODIMENT

As required, a detailed illustrative embodiment of the invention is disclosed herein. However, it is to be understood that the embodiment merely exemplifies the invention which may take many different forms that are radically different from the specific illustrative embodiments disclosed herein. Therefore, specific structural and functional details disclosed herein are not to be interpreted as limiting, but merely as a basis for the claims defining the scope and content of the invention.

Referring initially to FIG. 1, an elongated shank 12 is fragmentarily illustrated with a uniform central section omitted for more effective illustration. One end 14 of the shank 12 matingly receives an end 16 of a tool-holding head 18. As considered in detail, the head 18 supports a cutting insert 20 whereby the combination is effective for use with a machine tool as generally well known in the art.

Considering the component parts in greater detail, the shank 12 (FIG. 2) defines an internal transversely extending bore 22 which does not completely penetrate the shank, i.e., is open at one end only. The bore 22 is also open through the end 14 of the shank as a result of an elongate slot 24 which is somewhat radial (FIG. 1), extending outwardly in an oblong circular shape.

The transverse or radially extending bore 22 (FIG. 2) telescopically receives a cylindrical pin 26 in snug, sliding relationship. In turn, the cylindrical pin 26 receives a transverse stud 28 in a threaded bore 30 which extends transverse or normal to the cylindrical axis of the pin 26. The stud 28 is also fixed in the head 18 and, accordingly, clamps the head 18 to the shank 12. More specifically, the stud 28 passes through an axially parallel bore 32 in the head 18 and is held therein as a result of the stud head 34 being received in a counter bore 36 which is concentrically aligned with the bore 32. Consequently, as the stud 28 is threadably turned into the bore 30 in the pin 26, the head 18 is clamped to the end 14 of the shank 12.

The end 14 (FIG. 1) of the shank 12 is stepped to define a diametrically extending step or shoulder 40. A mating or inverted shoulder 42 is provided in the end 16 of the head 18. Consequently, the end 14 of the shank 12 matingly engages the end 16 of the head 18 in three-dimensional surface contact, for improved rigidity. Of course, various other three-dimensional mating surfaces may be provided on specific bar designs to afford this feature.

Another significant feature resides in the external configuration of the bar. That is, the external configuration of both the shank 12 and the head 18 is significant to the device. Generally, the shank 12 comprises an elongated rod or cylindrical shape, altered by the provision of a flat surface 46 (FIGS. 1 and 4) and a diametrically opposed flat surface 48 which is terminated by a radially extending shoulder 50 (FIG. 1). The flat surface 46 provides a reference table or platform for measurements as described in detail below, while the opening afforded by the surface 48 and the shoulder 50 affords an exit for coolant, which may carry chips produced by the machinery operation.

The shape of the head 18 (FIG. 1) is somewhat of a disk or flat cylindrical configuration with the annular edge altered by a flat surface 54 along one side, which surface is similar to and continuous with the surface 46 when the head 18 is affixed to the shank 12. The annular edge of the head 18 is also modified to define internally perpendicular surfaces 56 and 58 which matingly align with the surface 48 and the shoulder 50, respectively on the shank 12. The surface 56 is interrupted by a beveled edge 60 which affords access and convenience in setting and removing the insert 20 as well as accommodating coolant flow patterns to remove chips.

The cutting insert 20 (FIG. 1) is received by the head 18 in an open, triangular recess 62 which is formed in coplanar relationship with a somewhat radially extending gap 64. The gap 64 has one wall which is surface aligned with the surface 58 in which the triangular recess 62 is defined. The other internal surface 65 of the gap 64 (upper as shown) is stepped to define a shoulder 67 extending in alignment with the gap 64.

The cutting insert 20 is held in the triangular recess 62 by a holder 66 (FIG. 1) comprising a parallelepiped body 68 with internal cam surfaces 83, and which is snugly received in the gap 64. An integral, aligned arm 70 bearing a normally extending projection pin 72 is matingly received in a bore 74 that is centrally defined in the insert 20. The arm 70 may also be formed, depending upon the cutting edge configuration, to define a shoulder 76 (FIG. 1) which trails the cutting edge 78 of the insert 20 and functions as a chip breaker.

The combination of the holder 66 and the cutting insert 20 is held locked in the head 18 by a set screw 80 (FIG. 4) having a pointed end, and which is fully received in a threaded bore 82. Specifically, a tapered end 84 of the set screw 80 anchors the cutting combination by engagement with an indentation 86 in the body 68. Of course, the body 68 also engages the shoulder 67 (FIG. 1) for support. The tapered or pointed end 84 engages the indentation 86 in such a manner as to force the body 68 downward and inward in view of the arcuate cam surfaces. Specifically, the rear or inward surface 83 tapers to provide a cam action forcing the insert 20 into the recess 62 while the lower cam surface 87 forces the insert downward. Thus, cam locking engagement occurs.

The composite boring bar as described above may be variously manufactured by well known machining or casting techniques. Various materials, as steel alloys, as well known, may be employed and, of course, a range of sizes may be desirable. However, the important functional considerations reside in the rigidity of the boring bar, the adjustability of the bar, the economy of manufacturing the bar and the ease of using the bar.

In setting up the bar for use, an insert 20 is first selected for the specific job to be undertaken. The selected insert 20 is fitted into the triangular recess 62 with the holder 66 positioned in the gap 64 and so that the pin 72 is received in the bore 74 of the insert. With these components so positioned, the set screw 80 is turned into the bore 82 (FIG. 4) locking the holder 66 and the insert 20 in position.

Figure 2:
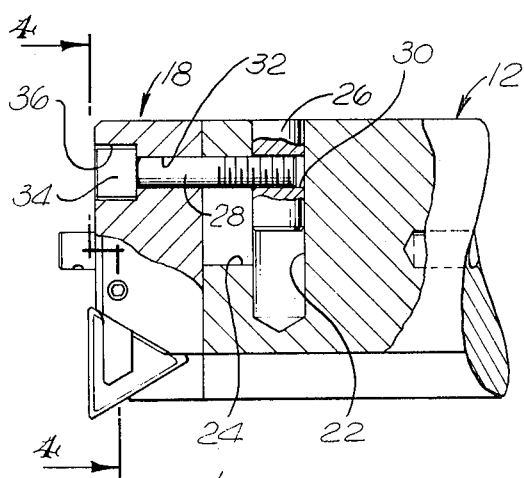
FIG. 2 is a sectionalized, side-elevation view of a portion of the structure of FIG. 1 showing the components in one configuration.
Figure 3:
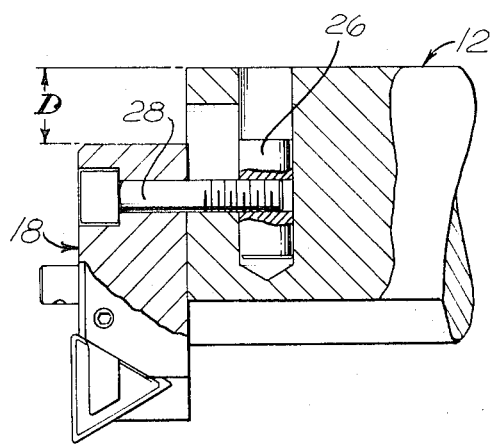
FIG. 3 is a view similar to that of FIG. 2 showing the compoents in another configuration.

Next, the head 18 is affixed to the shank 12 by fitting the pin 26 (FIG. 2) into the bore 22 of the shank 12 and passing the stud 28 through the bore 32 in the head 18 then threadably engaging the stud 28 with the bore 30 in the pin 26. Upon accomplishing a loose engagement, between the stud 28 and the pin 26, the head 18 may be radially moved in relation to the shank 12. For example, the head 18 may be aligned with the shank 12 as depicted in FIG. 2, or offset therefrom by a distance D, as illustrated in FIG. 3. Of course, a continuity of adjustment exists so that any position may be selected with the range provided.

Figure 4:
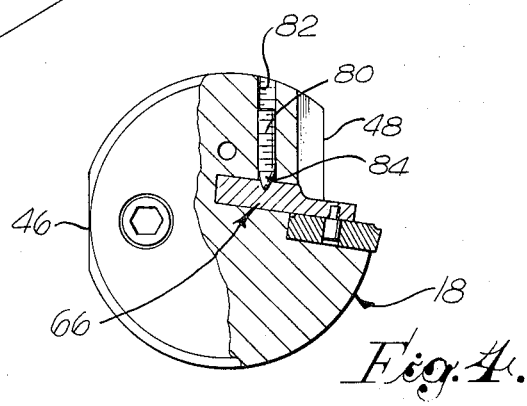
FIG. 4 is a view taken along line 4—4 of FIG. 2.

The next step in preparing the bar for use is that of setting the operating radius of the cutter 20. This operation may be performed rather simply by engaging a micrometer (not shown) with the surface 46 (and/or the surface 54) to gauge the distance to the cutting tip 78 (FIG. 4). Upon accomplishing the desired setting, in accordance with the micrometer, the stud 28 is turned down, to clampingly engage the head 18 to the shank 12 (FIG. 2). Accordingly, the bar is prepared for use.

Figure 5:
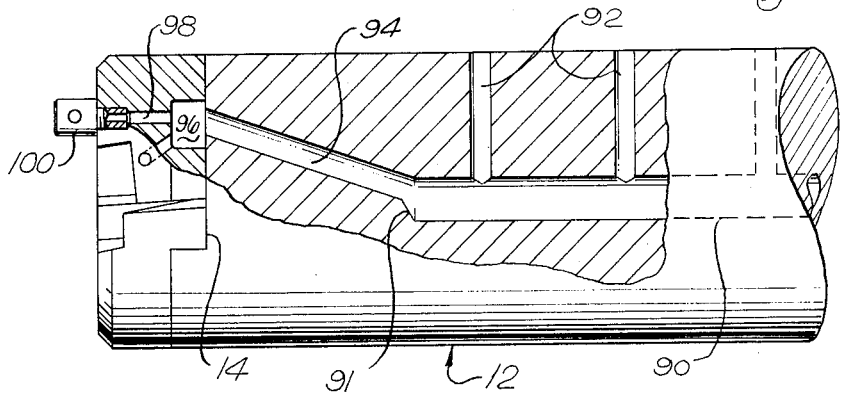
FIG. 5 is another sectionalized view of the structure of FIG. 1 illustrating other structural details.

As indicated above, the bar hereof incorporates an effective coolant-delivery arrangement. However, the specific considerations above have related primarily to the cutting structure. Accordingly, the coolant structure will be considered in detail prior to explaining its operation. Specifically, a central or axial passage 90 (FIG. 5) extends substantially the full length of the shank 12, terminating at a junction 91, a short distance from the end 14. Radially extending shafts 92 are provided from the central passage 90 whereby to enable substantial lubricant flow as for removing chips. However, another shaft 94 extends from the junction 91 to a chamber 96 which is defined in the facing surface 16 of the head 18. From the chamber 96, an axially parallel passage 98 extends through the head 18 terminating in a threaded section which receives a nozzle fitting 100. The fitting 100, has an angular passage therethrough and accordingly, turns a stream of fluid coolant, directing it substantially at the cutting edge or tip 78. Note that the relationship between the fitting 100 and the head 14 may be variously fixed and the coolant directed in a radial stream as desired.

Figure 6:
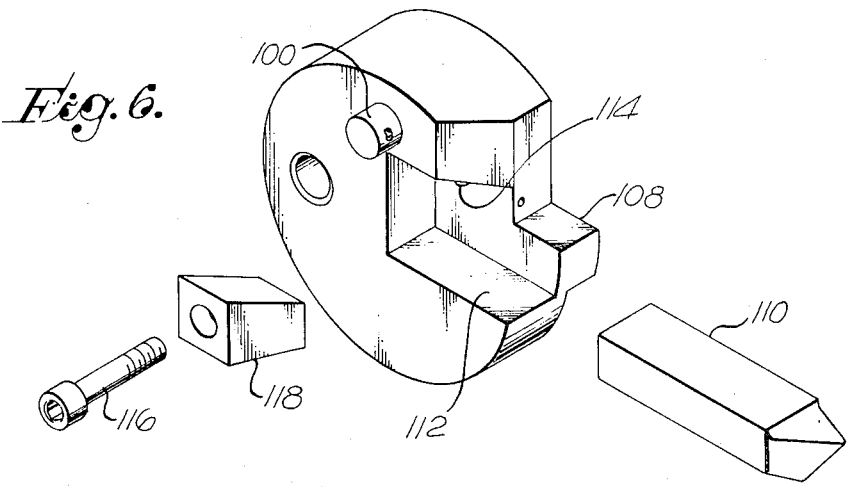
FIG. 6 is an exploded view of an alternative form of a portion of the structure of FIG. 1.
Figure 7:
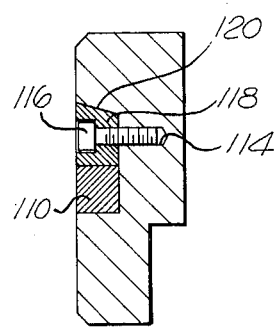
FIG. 7 is a vertical, sectional view taken centrally through the structure of FIG. 6.

In the exemplary embodiment set forth above, the boring bar as disclosed supports a cutting insert 20 which may comprise cemented carbide. Although a triangular insert is illustrated, it will be readily apparent that other forms including diamond shapes, disk forms and so on may also be employed. However, additionally, the boring bar may also be employed effectively to support a conventional or standard cutting tool. In that regard, an alternate head 108 is illustrated in FIGS. 6 and 7 for holding a cutting tool 110. Generally, the overall configuration of the head 108 is similar to the overall configuration of the head 18; however, an enlarged rectangular-configuration open gap 112 replaces the recess 62 and the gap 64. The open gap 112 has a threaded bore 114 defined in the bottom thereof for locking engagement with a stud 116 (FIG. 7) which passes through a lockbar 118 having a tapered surface 120. The lockbar 118 is positioned adjacent a tool 110 and, accordingly, locking engagement is accomplished.

Of course, it is to be appreciated that several other different forms of locking arrangements may be provided to hold inserts or cutting tools in the head of a boring bar constructed in accordance herewith. An alternative to the structural embodiment described above for holding the insert 20 is illustrated in FIG. 8. Specifically, the head 130 is generally similar in shape and outer configuration to the head 18; however, a slightly enlarged gap 132 is provided in place of the gap 64. The gap 132 receives a grooved holder 134 having an extension arm 136 with a right-angle holding pin 138 as previously described. However, a corner-defining groove 140 is provided, extending linearly the length of the body 134. The groove receives the set screw 80 in any of a variety of positions thereby enabling a degree of variation.

With the set screw 80 turned down into the threaded bore 82, the tapered tip 84 of the screw is received in the groove 140 of the holder 134. Thus, the holder 134 is locked into the gap 132, fixing the insert 20 into the triangular recess 62. Of course, various other modifications and alterations may be provided for a boring bar in accordance herewith; accordingly, the scope hereof is deemed to be in accordance with the claims as set forth below.

What is claimed is:

1. A boring bar for use in a machine tool with a cutting member, comprising:

an elongated somewhat cylindrical shank defining a first surface including a first axially parallel shoulder at one end thereof and further defining a transverse passage, open to said first surface through a defined slot;

a pin telescopically received in said transverse passage;

a somewhat cylindrical head for receivably supporting said cutting member and defining a second surface including a second axially parallel shoulder for abutting engagement with said first surface and said first shoulder; and means connecting said head to said shank and slidable in said slot by releasably engaging said head to said pin to adjustably clamp said head to said shank in various transverse positions with respect to each other and parallel to said passage.

2. A boring bar according to claim 1 wherein said pin is cylindrical and is matingly received in said transverse passage defined as a closed bore in said shank.

3. A boring bar according to claim 1 wherein said first and second shoulders extend somewhat diametrically across said first and second surfaces.

4. A boring bar according to claim 1 wherein said means for engaging said head to said pin comprises a stud extending through said head and being threadably received in said pin.

5. A boring bar according to claim 1 wherein said shank and said head being of somewhat cylindrical configuration have index alignment surfaces defined thereon.

6. A boring bar according to claim 1 wherein said head further defines a radially-extending indentation for receiving said cutting member and further includes cam-action locking means for affixing said cutting member in said indentation.

* * * * *